United States Patent [19]
Fitzgibbons

[11] Patent Number: 4,834,139
[45] Date of Patent: * May 30, 1989

[54] RADIAL SEAL HYDRAULIC COUPLER

[75] Inventor: Michael R. Fitzgibbons, Houston, Tex.

[73] Assignee: Ferranti Subsea Systems, Inc., Sugar Land, Tex.

[ * ] Notice: The portion of the term of this patent subsequent to Sep. 6, 2005 has been disclaimed.

[21] Appl. No.: 212,411

[22] Filed: Jun. 27, 1988

Related U.S. Application Data

[63] Continuation-in-part of Ser. No. 126,033, Nov. 27, 1987, Pat. No. 4,709,726.

[51] Int. Cl.⁴ ............................................. F16L 37/28
[52] U.S. Cl. .............................. 137/614.04; 285/111; 277/27
[58] Field of Search ................ 251/149.7; 137/614.04, 137/614.01, 614.02, 614.03, 614.05, 614.06, 315; 277/167.3, 27, 205; 285/100, 101, 111, 223, 224

[56] References Cited

U.S. PATENT DOCUMENTS

| | | | |
|---|---|---|---|
| 2,265,267 | 12/1941 | Cowles | 285/111 |
| 3,139,110 | 6/1964 | Bales | 137/614.04 |
| 3,498,324 | 3/1970 | Bruining | 137/614.04 |
| 3,508,580 | 4/1970 | Snyder, Jr. | 137/614.04 |
| 4,509,554 | 4/1985 | Failla | 137/614.05 |
| 4,602,806 | 7/1986 | Saliger | 277/27 |
| 4,694,859 | 9/1987 | Smith, III | 137/614.04 |
| 4,709,726 | 12/1987 | Fitzgibbons | 137/614.04 |

Primary Examiner—A. Michael Chambers
Attorney, Agent, or Firm—Browning, Bushman, Zamecki & Anderson

[57] ABSTRACT

An improved hydraulic coupler suitable for interconnecting subsea fluid lines is provided with a radial seal between the male and female body portions. A C-shaped metallic seal is housed between the female body of the coupler and a retainer external of the female body. An elastomeric secondary seal is provided on the retainer, and sealingly engages the same diameter cylindrical surface of the male coupler which is engaged by the C-shaped seal. A wiper member also mounted on the retainer cleans this cylindrical suface as the body portions are brought together, thereby enhancing the reliability of both the elastomeric seal and the metallic seal. Coupler halves may typically be housed within either a latchable subsea control module mounting base or a junction plate conventionally used in surface petroleum recovery operations.

18 Claims, 1 Drawing Sheet

RADIAL SEAL HYDRAULIC COUPLER

CROSS-REFERENCE TO RELATED CASES

The present invention is a continuation-in-part of U.S. Ser. No. 126,033, filed on Nov. 27, 1987, now U.S. Pat. No. 4,709,726.

BACKGROUND OF THE INVENTION

1. Field of the Invention

The present invention relates to a male/female fluid coupling with a radial seal and, more particularly, to a highly reliable fluid coupling suitable for sealably maintaining fluid pressure after repeated mating and unmating operations.

2. Description of the Background

Conventional male/female couplings have long been used to sealingly join pressurized fluid lines. The coupling halves, when joined, automatically enable the fluid and/or fluid pressure to be transmitted through the coupling without a significant pressure differential. When unmated, the valve poppet in the body of each coupler half automatically seals the fluid within each coupler body and its respective fluid line. Such couplers are able to reliably maintain high fluid pressure after repeated mating and unmating operations.

The seal between the joined coupling halves may conventionally be provided by either an elastomeric or metallic member. One type of coupler suitable for reliably interconnecting fluid lines employs a metallic face seal. Sealing engagement is provided by a metallic seal sandwiched between surfaces of the coupler halves, with each sealing surface being generally perpendicular to the axis of the coupler. Other types of couplers employ metallic radial seals which are sealingly responsive to fluid pressure. In some applications, metallic radial seals are preferred in couplers over metallic face seals.

Current designs for metallic radial seal couplers are, however, susceptible to poor reliability. The male cylindrical surface to be engaged by the radial seal is poor, and retainers for the seals are susceptible to blowout under high pressure pulsations.

Coupler halves are frequently mounted in close proximity to reduce the space required to couple multiple lines. In subsea applications as shown in Ser. No. 126,033, for example, the overall diameter of the cylindrical-shaped coupler effectively controls the required size of a control module mounting base, and thus the overall cost of the subsea installation. A reliable subsea coupler is of primary importance, although a preferred coupler would frequently also have a reduced diameter.

A further disadvantage of prior art couplers relates to the high manufacturing costs for the coupler components in order to ensure reliable sealing engagement in hostile environments. A preferred coupler design thus will repeatedly and reliably both seal fluids beings transmitted through the coupler from the surrounding environment, will seal the surrounding environment from the interior fluids, and will accomplish these goals at a reduced manufacturing cost for the coupler.

The disadvantages of the prior art are overcome by the present invention, and an improved highly reliable coupler is hereinafter described suitable for sealably maintaining fluid pressure in both the coupled and uncoupled conditions after repeated mating and unmating operations.

SUMMARY OF THE INVENTION

An improved coupling for transmitting fluid pressure comprises conventional male and female body components. High reliability is obtained by providing a metallic compressible seal for sealing fluids between the coupling halves when mated. The seal is oriented for engagement with a substantially cylindrical surface on each body, which surfaces are each axially aligned with the axis of the coupling. A secondary or backup elastomeric seal is provided on the female body for sealingly engaging the same diameter cylindrical surface on the male body as that engaged by the metallic seal. A separate elastomeric wiper positioned on the female body removes particulate, grease, or other matter from this cylindrical surface, thereby increasing sealing reliability. The retainer for the seals is threadably connected to the female body, thereby enhancing structural integrity of the coupling and reducing the likelihood of blowout.

According to the present invention, the retainer which maintains the metallic radial seal in position with respect to the female body is completely external of the female body. The retainer is secured to the female body by threads on the exterior surface of the body, thereby allowing for the positioning of one or more seals between the female body and the retainer to seal the threads from the external environment. An annular recess is provided adjacent an end surface of the female body for receiving the metallic seal, and the retainer is held in fixed engagement with this end surface of the female body. The structural integrity of the coupling may be maintained with a reduced diameter coupling since the grooves in the retainer are axially spaced from the threads on the retainer for engagement with the female body. The design of the present invention reduces manufacturing costs while also allowing for a coupling with a reduced overall diameter, thereby facilitating closer positioning of multiple couplings and again reducing costs.

The present invention thus provides a highly reliable coupling with improved performance over prior art couplings. The features and advantages of the present invention will be more fully understood from the subsequent description, wherein reference is made to the figures in the following drawings.

DETAILED DESCRIPTION OF PREFERRED EMBODIMENTS

Figures 1, 2:
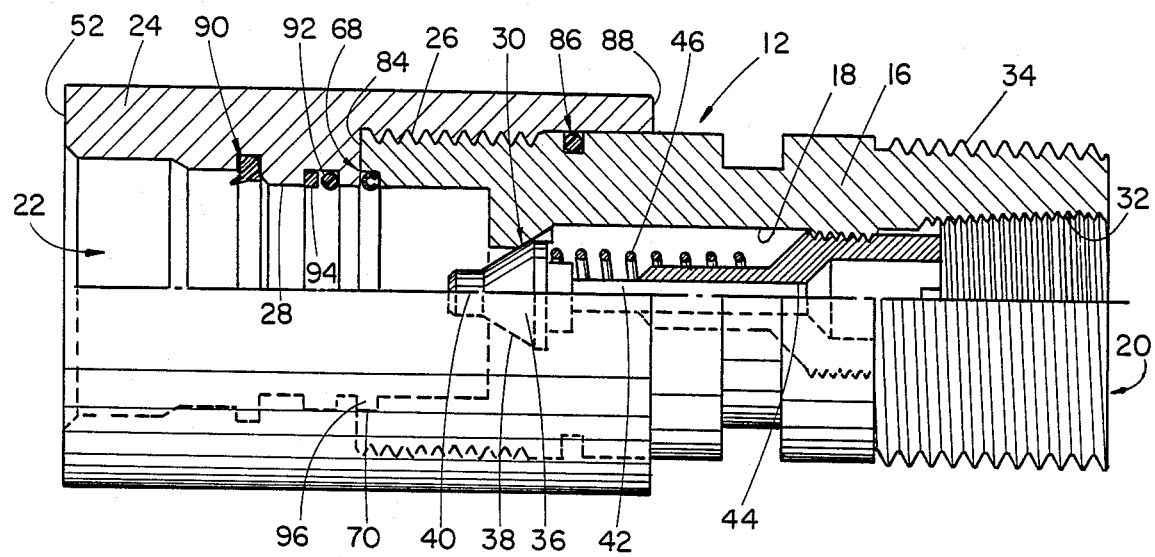
FIG. 1 is a side view, partially in cross-section, of a suitable embodiment of the female half of the coupling according to the present invention.
FIG. 2 is a side view, partially in cross-section, of a suitable male coupling body according to the present invention.

The female coupling half 12 shown in FIG. 1 and the male coupling half 14 shown in FIG. 2 may be axially aligned in a conventional manner for mated engagement to form a coupling of the present invention. In a typical application, a plurality of couplings each comprising coupling halves 12 and 14 and each interconnected with respective fluid lines are provided in female and male umbilical junction plates of a monitoring and/or control system of a hydrocarbon recovery system. In another application, the male coupling halves 14 can each be mounted in a subsea control module mounting base, while the female coupling halves 12 are each similarly mounted in the interface flange of a control module. When mated, the coupling halves interconnect respective fluid lines without loss of fluid or fluid pressure being transmitted through the lines, while each coupling also seals the exterior subsea environment from the transmitted fluids. Mating and unmating of the couplings results in little, if any, loss of transmitted fluid to the environment, and the subsea mounting bases may be coupled and uncoupled numerous times during the life of the subsea operation. Further details regarding suitable applications for the coupling of the present invention are described in the previously referenced application.

Female coupling half 12 includes a body 16 with a generally cylindrical configuration, including two or more planar surfaces (not shown) for enabling rotation of the body 16 with a conventional tool. Body 16 includes a coupling sealing end including conical surface 30, and a threaded end portion including interior threads 32 for sealing engagement with a suitable fluid line (not shown), and exterior threads 34 for captivating the body 16 to a suitable mounting plate (not shown). A central passageway defined in part by cylindrical surface 18 having an axis for alignment with the axis of the passageway of the male coupling half 12 interconnects ports 20 and 22. A retainer 24 is threaded at 26 to exterior threads on the female body, substantially defined by a cylindrical wall 28. Valve poppet 36 includes a conical sealing surface 38, tip end 40, and a cylindrical stem portion 42. A guide 44 is provided within the female body for receiving stem portion 42 and a spring 46 biases the poppet 36 to its sealed position.

Male coupling half 14 includes a generally cylindrical body 48 with planar surfaces (not shown) for facilitating rotation, and having an expanded portion 50 for engagement with the end surface 52 of the female coupling half 12. Component 14 has a cylindrical passageway substantially defined by two inner cylindrical surfaces 54, 56 having aligned central axes and together interconnecting ports 58 and 60. Sidewalls adjacent port 58 are threaded at 62 for sealing with a suitable hose or line connection (not depicted). The coupling half 14 includes a spring biased valve poppet 64 and a guide 66 similar to the components previously described.

When uncoupled, the valve poppets seal with the metal body of the coupling halves to seal fluid within each coupling half and its respective fluid line. When coupled, the tip end of the poppets engage, compressing the biasing springs and thereby unsealing the valve poppets from the metal sealing surface of the respective coupling body. When coupled, a fluid tight seal between the bodies 16 and 48 is obtained by circular metallic ring 68 shown in FIG. 1. Seal 68 sealingly engages cylindrical surfaces 70 and 72 on the female and male bodies, respectively, each having an axis aligned with the axis of the passageway through the coupling.

Metal seal 68 is retained in body 16 by seal retainer 24, which in turn is threadably secured to the body 16 and held in engagement with the planar end surface 84 of the female body by threads 26. One or more static seals 86 are provided axially positioned between the threads 26 and end surface 88 of the retainer 24 for sealing between the body 16 and the retainer 24, and for protecting the threads 26 from the exterior environment. A wiper seal 90 is contained on retainer 24, and serves to wipe clean surface 72 as the coupling is mated, thereby increasing the sealing reliability of metallic seal 68. An elostomeric O-ring 92 with a compressible backup member 94 provides a secondary seal to the primary metallic seal 68. It is a feature of the present invention that sealing integrity between the mated male and female coupling bodies is provided by a metallic pressure responsive primary seal 68, an elastomeric secondary seal 92, and a wiper seal 90—each of which engages the same diameter cylindrical surface 72 of the male body. The wiper seal 90 is primarily provided for wiping debris off the surface 72 as the coupling is mated, thereby providing a clean sealing surface for both seals 68 and 72, and need not accomplish any sealing function between the male and female body components. Sealing integrity of seal 92 is enhanced by providing a separate member 90 for wiping the sealing surface 72 of the male body, rather than attempting to accomplish both wiping and sealing functions with seal 72. The arrangement as shown in FIG. 1 ensures that a "fluid lock" situation cannot develop as the coupling halves are mated and/or unmated, which situation may occur if the seal 68 is adapted for sealing on a smaller diameter cylindrical surface of the male body than the surface on the male body adapted for sealing with seal 92.

Referring again to FIG. 1, the retainer 24 and body 16 form an annular cavity 96 having rectangular cross-sectional configuration for receiving the metallic C-ring 68. Retainer 24 thus prevents movement of seal 68 with respect to the female body 16, and retains the seal 68 within the body 16 prior to mating of the coupling. Regardless of the direction of fluid flow through the male coupling, the circumferential slot in seal 68 is provided opposite the body of the male coupling half 14. The base side of the seal (the side opposite the slot) is thus engaged during the mating operation, thereby allowing the cylindrical surface 72 to easily slide by the seal 68. The seal may be provided on either the male or female component, although when provided on the female component, as shown in FIG. 1, the metallic seal is protected with the retainer 24. In the embodiment described herein, the female component is also the component which is typically returned to the surface with the control module or juncture plate, so that the seal is preferably provided on the female component (for protection of the seal) and on the retrievable component (for facilitating inspection and/or replacement).

The retainer 24 is preferably threadably secured to the body 16, as shown in FIG. 1. Since the retainer is external of the female body, the threads 26 which interconnect the female body and the retainer may be axially spaced from the backup elastomeric seal 92 and the wiper 90. The coupling components are designed to reduce the likelihood of catastrophic failure of the coupling if the primary metal seal were to leak. Accordingly, the retainer and the female body are sized to maintain structural integrity in response to such a secondary pressure or primary seal leak-through pressure. Accordingly, in the present invention, the wiper 90 and seal 92, and accordingly the grooves in the retainer for housing these components, are each axially spaced from the threads 26. The coupling of the present invention may thus maintain structural integrity and yet have an overall diameter less than the overall diameter of a coupling in which the threads on the retainer are axially at the same position as the groove for the backup seal or the wiper on the retainer. This reduced diameter feature not only reduces manufacturing costs, but allows multiple couplers to be more closely positioned, as previously noted. The threaded arrangement also provides the strength necessary to prevent failure of the mechanical connection between the retainer and the female body which may otherwise occur when high pressure pulsations pass through the coupling. The coupling of the present invention is thus less susceptible to failure and can more reliably withstand high pressure pulsations.

Torqued engagement of the retainer with end surface 84 on the female body reliably controls axial "play" or movement of the metallic seal 68 with respect to the female body. The seal 68 is thus prevented from axial movement by the retainer 24 and the body 16. According to the present invention, the cost of manufacturing and inspecting the coupler half 12 are reduced since the retainer is external of the female body. The proper dimensioning for the annular cavity 96 which receives the metal seal 68 can be more easily obtained according to the design of the present invention than if the groove were substantially recessed within the interior of the female body. Moreover, inspection of the groove and the conical sealing surface 38 in the female body is facilitated since these components are significantly closer to the male receiving end surface of the female body than would be the case if the retainer were partially internal of the female body, as depicted in the earlier referenced patent application.

Although the invention has been particularly described in the environment of surface or subsea petroleum recovery operations, it should be understood that a coupling of the type described herein may be used in various applications. In particular, the primary benefits of high reliability (both in terms of mating and sealing efficiency) and reduced axially directed coupling force render the coupling particularly well suited for remote operations. The coupling herein described would thus be well suited for use in subterranean operations, in medical equipment and techniques and in outer space applications.

Although the invention has been described in terms of the specified embodiments which are set forth in detail, it should be understood that this is by illustration only and that the invention is not necessarily limited thereto, since alternative embodiments and operating techniques will become apparent to those skilled in the art in view of the disclosure. Accordingly, modifications are contemplated which can be made without departing from the spirit of the described invention.

What is claimed is:

1. In a hydraulic coupling of the type employing male and female coupling bodies each having a fluid passageway therethrough for the transmission of fluids, the fluid passageways being in communication when the coupling is mated, each coupling body including a sealing surface for sealing engagement when the coupling is unmated with a valve poppet movably mounted within the respective coupling passageway, the valve poppets within each coupling body having tip ends adapted for engagement when the coupling is mated for unsealing each valve poppet from its respective sealing surface within the coupling body and thereby allowing the transmission of fluid through the mated coupling, the improvement comprising:

the male coupling body including a cylindrical outer metal surface of a uniform diameter;
a circular metallic-material seal ring housed within the female body for sealing engagement with the cylindrical outer surface of the male coupling body and an inner surface of the female coupling body for sealing the coupling bodies when mated;
a retainer external of the female coupling body and having threads for mating engagement with external threads on the female body for retaining the metallic ring with the female body;
a circular elastomeric-material seal ring carried on the retainer for sealing engagement between the cylindrical outer surface of the male coupling body and the retainer when the coupling bodies are mated; and
a wiper ring carried on the retainer for wiping the cylindrical outer surface of the male coupling body while the coupling bodies are moved into mating engagement;
the elastomeric-material seal ring being axially positioned between the wiper ring and the metallic-material seal ring such that the wiper seal wipes the outer surface of the male coupling body, the elastomeric-material seal ring then engages the outer surface of the male coupling body, and the metallic-material seal then engages the outer surface of the male coupling body as the male and female coupling bodies are moved into mating engagement.

2. The improvement as defined in claim 1, wherein the threads of the retainer are axially spaced from the seal ring and the wiper ring.

3. The improvement as defined in claim 1, wherein the metallic-material seal ring includes a central bore open to fluid pressure within the mated coupling.

4. The improvement as defined in claim 3, wherein the metallic-material seal ring has a C-shaped cross-sectional configuration along the entire length thereof with a circumferential slot open to fluid pressure within the mated coupling.

5. The improvement as defined in claim 1, further comprising:
an elastomeric backup ring in engagement with the elastomeric-material ring.

6. The improvement as defined in claim 1, wherein the retainer means comprises:
a sleeve-shaped retainer for engagement with a planar and surface of the female coupling body; and
the threads on the retainer for threaded engagement with the female coupling body are spaced axially opposite the seal ring with respect to the end surface of the female coupling body.

7. The improvement as defined in claim 1, wherein opposite ends of each coupling body are threaded for sealing engagement with respective fluid lines.

8. The improvement as defined in claim 5, further comprising:
a static elastomeric-materal seal between the retainer and the female body and spaced axially opposite the metallic-material seal ring with respect to the threads on the retainer.

9. In a hydraulic coupling of the type employing male and female coupling bodies each having a fluid passageway therethrough for the transmission of fluid and including a sealing surface for sealing engagement when the coupling is unmated with a valve means movably mounted within the respective passageway of each coupling body, the female coupling body having a fluid receiving end and an opposing male-receiving end, the valve means within each coupling body having end portions adapted for engagement when the coupling bodies are mated for unseating each valve means from its respective sealing surface for allowing the transmission of fluid through the mated coupling, the improvement comprising:

the male coupling body including a cylindrical outer sealing surface of a uniform diameter;

the female coupling body having a planar end surface and external threads on an exterior surface of the female coupling body;

a first seal ring for sealing engagement between the cylindrical outer surface of the male coupling body and a sealing surface on the female coupling body, the first seal ring in cross-section having an opening facing the fluid receiving end of the female coupling body to increase sealing effectiveness of the first seal ring;

retainer means having a male coupling body receiving end, an axially opposing end surface radially exterior of the female coupling body, and a stop surface for fixedly engaging the planar end surface on the female coupling body and retaining the first seal ring within the female coupling body, the retainer means further having threads positioned axially between the stop surface and the axially opposing end surface for mating engagement with the external threads on the female coupling body;

a second compressible elastomeric-material seal ring carried on the retainer means axially opposite the external threads with respect to the stop surface on the retainer means for sealing engagement between the retainer and the cylindrical outer sealing surface of the male coupling body; and the second seal ring being axially spaced such that the second seal ring engages the outer surface of the male coupling body, then the first seal ring engages the outer surface of the male coupling body as the male and female coupling bodies are moved into mated engagement.

10. The improvement as defined in claim 9, further comprising:

a wiper ring carried on the retainer means for wiping the cylindrical outer surface of the male coupling body while the coupling bodies are moved into mating engagement;

a static seal between the retainer and the female body and spaced axially opposite the metallic-material seal ring with respect to the threads on the retainer.

11. The improvement as defined in claim 9, wherein the first seal ring is a compressible metallic-material seal ring.

12. The improvement as defined in claim 9, wherein the first seal ring is a circular metallic-material seal ring having a C-shaped cross-sectional configuration.

13. The improvement as defined in claim 9, further comprising:

A static elastomeric-material seal between the retainer means and the female coupling body and spaced axially opposite the stop surface with respect to the threads on the retainer means.

14. The improvement as defined in claim 9, wherein axially opposite ends of each of the male and female coupling bodies are threaded for sealing engagement with respective fluid lines.

15. A method for sealingly mating a hydraulic coupling of the type employing male and female coupling bodies each having a fluid passageway therethrough for the transmission of fluid, the fluid passageways being in communication when the coupling is mated, each coupling body including a sealing surface for sealing engagement when the coupling is unmated with a valve means movably mounted within the respective passageway of each body, the valve means within each coupling having tip ends adapted for engagement when the coupling bodies are mated for unsealing each valve means from its respective sealing surface in the coupling body for allowing the transmission of fluid through the mated coupling, the method comprising:

forming a cylindrical outer sealing surface of a uniform diameter on the male coupling body;

forming an inner sealing surface on the female coupling body;

placing a first ring on the female coupling body for sealing engagement between the cylindrical outer surface of the male coupling body and the inner sealing surface on the female coupling body when the coupling bodies are mated;

threading a retainer to external threads on the female coupling body to position the retainer external of the female coupling body while retaining the first seal in the female coupling body;

positioning an elastomeric-material second ring on the retainer for sealing engagement with the cylindrical outer surface of the male coupling body;

positioning a wiper ring on the retainer for wiping the cylindrical outer surface of the male coupling body; and moving the male coupling body toward mating engagement with the female coupling body, such that the wiper ring first wipes the cylindrical outer surface of the male coupling body, the elastomeric-material seal then engages the cylindrical outer surface of the male coupling body, then the first seal ring engages the cylindrical outer surface of the male coupling body.

16. The method as defined in claim 15, wherein threads on the retainer are positioned axially from the second ring and the wiper ring.

17. The method as defined in claim 15, further comprising:

providing a metallic-material seal ring for the first seal ring with a central bore open to fluid pressure within the mated coupling.

18. The method as defined in claim 15, further comprising:

providing a static seal between female body and the retainer and positioned axially opposite to first seal with respect to threads on the retainer.

* * * * *

UNITED STATES PATENT AND TRADEMARK OFFICE
CERTIFICATE OF CORRECTION

PATENT NO. : 4,834,139

DATED : May 30, 1989

INVENTOR(S) : Michael R. Fitzgibbons

It is certified that error appears in the above-identified patent and that said Letters Patent is hereby corrected as shown below:

Column 6, line 44, delete "and", first occurrence, and insert therefor --end--.

Signed and Sealed this

Twenty-third Day of January, 1990

*Attest:*

JEFFREY M. SAMUELS

*Attesting Officer*     *Acting Commissioner of Patents and Trademarks*